(12) United States Patent
Bouchet

(10) Patent No.: US 6,816,927 B2
(45) Date of Patent: Nov. 9, 2004

(54) METHOD AND SYSTEM FOR AUTOMATIC UPDATING AN ACCESS PATH TO THE SYSTEM DISK OF A HARDWARE PERIMETER OF COMPUTER

(75) Inventor: Alain Bouchet, Villiers-Adam (FR)

(73) Assignee: Bull S.A., Louveciennes (FR)

( * ) Notice: Subject to any disclaimer, the term of this patent is extended or adjusted under 35 U.S.C. 154(b) by 98 days.

(21) Appl. No.: 10/359,694

(22) Filed: Feb. 7, 2003

(65) Prior Publication Data

US 2003/0149813 A1 Aug. 7, 2003

(30) Foreign Application Priority Data

Feb. 7, 2002 (FR) ............................................ 02 01520

(51) Int. Cl.$^7$ ............................. G06F 3/00; G06F 12/00
(52) U.S. Cl. ...................... 710/38; 710/316; 709/221; 711/157
(58) Field of Search ........................... 710/8, 9, 36, 38, 710/316; 709/220, 221; 713/2, 100; 711/152, 157, 111

(56) References Cited

U.S. PATENT DOCUMENTS

| | | | |
|---|---|---|---|
| 5,345,590 A | | 9/1994 | Ault |
| 5,388,217 A | * | 2/1995 | Benzschawel et al. ........ 710/36 |
| 5,845,329 A | | 12/1998 | Onishi |
| 6,047,353 A | | 4/2000 | Vishlitzky et al. |
| 6,260,120 B1 | | 7/2001 | Blumenau |
| 6,671,776 B1 | * | 12/2003 | DeKoning ................... 711/114 |
| 6,732,166 B1 | * | 5/2004 | Woodruff .................... 709/221 |

* cited by examiner

Primary Examiner—Kim Huynh
(74) Attorney, Agent, or Firm—Miles & Stockbridge P.C.; Edward J. Kondracki

(57) ABSTRACT

A method for automatic updating of an access path to the system disk of a hardware perimeter of computer resources during launching of an operating activity on this perimeter includes during the installation of a new system disk, a step of saving the lower part of the access path to the new system disk in a list of access paths, on the occasion of the definition of the operating activity, a step of associating with this activity one of the lower parts stored in the list of access paths, and on the occasion of the launching of the activity on a perimeter, a step of automatic updating of the access path contained in the working memory of the perimeter as a function of the lower part of the access path associated with this activity during its definition. A system and memory for implementing the method are also discussed.

16 Claims, 3 Drawing Sheets

METHOD AND SYSTEM FOR AUTOMATIC UPDATING AN ACCESS PATH TO THE SYSTEM DISK OF A HARDWARE PERIMETER OF COMPUTER

CROSS REFERENCE TO RELATED APPLICATION

The subject matter of the subject invention is related to application Ser. No. 10/359,698 filed on Feb. 7, 2003, in the name of Alain BOUCHET, entitled "A METHOD AND A SYSTEM FOR MANAGING A PERSONAL EVENT LOG SPECIFIC TO AN OPERATING ACTIVITY EXECUTED ON A HARDWARE PERIMETER OF COMPUTER RESOURCES, AND MEMORY IMPLEMENTED IN THE SYSTEM", the subject matter of which is incorporated herein in its entirety.

TECHNICAL FIELD

The invention relates to a method and a system for automatic updating of an access path to the system disk of a hardware perimeter of computer resources during launching of an operating activity on this perimeter.

More precisely, the method and the system relate to configurable systems of computer resources which are adapted to:

configure several perimeters intended to be activated simultaneously or successively, each perimeter including:
- a central processing unit formed by one or several calculation cells of a multi-cell computer platform,
- resources common to the whole of the platform of which at least a system disk is connected to the central processing unit via addressable means for interconnection of the platform to the system disk, and
- a working memory containing the access path used during the activation of the perimeter in order to launch an operating system contained in the system disk, this access path being composed of an upper part defining the hardware elements to be run through in order to reach the interconnection means from the processing unit, this upper part being solely a function of the processing unit used in this perimeter, and a lower part defining the hardware elements to be run through in order to reach the system disk from the interconnection means, this lower part being solely a function of the position of the system disk with respect to the interconnection means, define an operating activity capable of being launched successively on several different perimeters, the activity bringing together software means to be utilised in order to carry out this activity, these software means including at least one operating system capable of managing the hardware resources of the perimeter on which the activity is to be launched.

BACKGROUND TO THE INVENTION

At the present time one of the main lines of development of computer hardware and/or systems concerns the implementation of a maximum flexibility of the configurable computer resources to the advantage of a user having significantly reduced computer resources locally.

In the current configurable or reconfigurable computer systems, as shown in FIG. 1, a multi-cell computer platform PF is used. The multi-cell platform PF is formed by a plurality of calculation cells $C_{kj}$ including at least one central processing unit and local working memories of which one is a non-volatile memory known as a NVRAM memory. The working memories of each cell include in particular a start-up program or BIOS (Basic Input/Output System) program and an access path to a system disc containing an operating system capable of managing a calculation cell or a group of calculation cells. On starting of the cell or the group of cells, the access path is used by the BIOS program to recognise the location of the system disk containing the operating system to be loaded and launched. The access path is usually stored in the NVRAM memory.

In the configurable or reconfigurable systems such as are shown in FIG. 1, there are resources common to the all of the cells of the platform. These common resources include bulk memories, among them in particular system disks and data disks. The data disks include for example application software to be executed and/or data to be processed. By way of example, in FIG. 1 the common resources include a data disk $DD_1$ containing application software $L_1$, a system disk $DS_1$ containing an operating system $OS_1$, a data disk $DD_2$ containing application software $L_2$ and a disk system $DS_2$ containing an operating system $OS_2$.

In order to ensure maximum flexibility of these systems, the common resources are connected to the platform PF by addressable interconnection means MI in accordance with a SAN (Storage Area Network) architecture. These interconnection means MI are intended to permit access to the common resources from any cell or group of cells configures on the platform PF. Thus a data disk can be accessed from a cell $C_{kj}$ in a given configuration of the platform PF, then subsequently by a cell $C_{kj+1}$ within the framework of a different configuration of the platform. Such interconnection means MI are therefore capable of permitting all of the cells of the platform to access the common resources without it being necessary for this purpose to carry out any rewiring operation.

Finally, the configurable or reconfigurable computer systems also include an administration tool MT which permits a user to bring together the computer hardware resources in perimeters of computer resources $P_i$ intended to execute operating activities $A_i$. Within the context of the configurable or reconfigurable systems, the term "operating activity" designates all of the software means necessary in order to implement a function which a user of the system wishes to carry out. Examples of such functions are, for example, the establishment of pay slips or the generation of lists of clients to contact. An activity therefore includes at least one operating system capable of managing the hardware computer resources of the platform. As the function required by the user is not generally met by the operating system by itself, an operating activity commonly has in addition one or several items of application software intended to be executed on the operating system in order to carry out the functions required by the user. Here, an activity $A_1$ includes the software $L_1$ and the operating system $OS_1$.

Each perimeter $P_i$ is formed by a group of cells $C_{kj}$ and a part of the common resources such as a data disk and at least one system disk. It is possible in these systems to define several perimeters $P_i$. For example, in FIG. 1 two perimeters $P_1$ and $P_2$ have been configured. The perimeter $P_i$, delimited by a first dotted line, includes a first group of cells, the data disk $DD_1$ and the system disk $DS_1$. The perimeter $P_2$, delimited by a second dotted line, includes a second group of cells separate from the first group of cells, the data disk $DD_2$ and the system disk $DS_2$.

When two perimeters such as the perimeters $P_1$ and $P_2$ of FIG. 1 each use material resources separate from those of the other perimeter, they can be executed simultaneously on the same platform. In the opposite case, they must be executed successively on the platform PF.

Such systems correspond to systems or machines which are usually designated by the term of partition machines. They normally permit the installation and execution simultaneously or successively of different operating activities $A_i$ in different perimeters of the platform. Nevertheless, when such an installation is carried out it is not generally possible for one and the same operating activity executed in a first perimeter to be transferred simply to a different perimeter without reinstallation or physical manipulation. In fact, the execution context of the operating activity containing for example the different environment variables necessary for starting or restarting the operating activity is saved, at least in part, in the local working memories of the perimeter. This is the case in particular for the access path to the system disk. Thus a user currently has two solutions available when he wishes to relaunch the activity $A_1$ hitherto executed in the perimeter $P_1$ in the new perimeter $P_2$. The first solution consists of physically replacing the system disk $DS_2$ of the perimeter $P_2$ by the system disk $DS_1$ of the perimeter $P_1$. At the end of the physical manipulation, the access path stored in the NVRAM memory of the perimeter $P_2$ does indeed correspond to an access path to the system disk $DS_1$.

The second solution consists of carrying out a reinstallation operation of the system disk of the perimeter $P_2$ in order to replace the access path currently stored in the local NVRAM memory of the perimeter $P_2$ by a corresponding new access path to the system disk $DS_1$. However, irrespective of the solution adopted in order to include the system disk of the activity $A_1$ in a new perimeter, the operations are long and tedious.

SUMMARY OF THE INVENTION

The invention aims to remedy this drawback by proposing a simpler method for including a new system disk in a computer perimeter configured on a multi-cell platform.

It therefore relates to a method of automatic updating of an access path to the system disk, in a configurable system, such as is defined above, characterised in that it comprises:
during the installation of a new system disk, a step of saving the lower part of the access path to the new system disk in a list of access paths stored in a memory,
on the occasion of the definition of the operating activity, a step of associating with this activity the lower part, stored in the list of access paths, corresponding to the system disk including the operating system launched during this activity,
on the occasion of the launching of the activity on a perimeter, a step of automatic updating of the access path contained in the working memory of this perimeter by combining the upper part of the access path of this perimeter with the lower part of the access path associated with this activity during its definition.

According to the method described above, irrespective of the perimeter used to install a system disk, at least the lower part of the access path to this new system disk is stored in a memory associated with the administration tool. Thus the information on the position of the system disk with respect to the interconnection means, determined during the first installation of this new system disk in a perimeter, is not reserved for the perimeter used to install this new system disk but, on the contrary, is stored in a memory with a view to being reused. This is what is done during the definition of a new activity in the method described above.

During this definition of a new activity, the new activity is associated with the lower part of the system disk contained in the memory. The lower part associated with the new activity corresponds to the system disk containing the operating system intended to be implemented in order to carry out this activity.

Then, during the launching of this new activity on a new perimeter, the access path to the system disk of this new perimeter is automatically updated. In fact, the upper part of the access path of the new perimeter is known since it is constant. This upper part is constant because in a configurable system such as is described above the system disks are connected to the corresponding processing units via addressable interconnection means. Therefore no rewiring operation is necessary in order to connect a processing unit to the interconnection means and the upper part of each perimeter is therefore constant.

In order to reconstruct an access path to the system disk containing the operating system to be launched during the execution of this new activity, only the lower part of the access path currently stored in the working memory of the new perimeter should be updated. For that, this lower part is replaced by the one associated with the activity which is going to be launched on this new perimeter. Thus the access path of the new perimeter is automatically updated without any rewiring operation or reinstallation of a system disk being necessary during the transfer of an activity from one perimeter to another perimeter.

According to other characteristics of a method for automatic updating of an access path to the system disk according to the invention:
the step of association consists of storing in the memory an identity file containing not only an identifier of the operating activity but also an identifier of the lower part of the access path recorded in the list, this lower part corresponding to the system disk including the operating system launched during the execution of this activity,
the step of saving includes an operation of neutralisation of the access path to be recorded in the list of access paths, this operation consisting of deleting the upper part of the complete access path to the new disk and only entering in the list of access paths the access path to the new system disk without its upper part,
when the installation of the new system disk is effected from a perimeter including a startup program (BIOS) capable of storing the access path to the new system disk in the working memory of this perimeter, the step of saving includes:
an operation of transmission to an administration tool associated with the memory of the lower part of the access path to the new system disk, this operation being carried out by the startup program, and
an operation of recording in the list of access paths of the lower part transmitted by the startup program, this operation being carried out by the administration tool,
during the operation of transmission of the lower part of the access path, the startup program transmits to the administration tool the complete access path to the new system disk, and the operation of neutralisation of the access path and the operation of recording in the list of access paths are carried out successively by the administration tool,
when an activity is launched on a perimeter including a startup program (BIOS) capable of launching the operating system, the method includes, after the step of updating of the new perimeter, a step of launching of the operating system corresponding to the updated access path, carried out by the startup program (BIOS).

The invention also relates to a configurable system of computer resources, including:

a plurality of hardware perimeters of computer resources intended to be activated simultaneously or successively, each perimeter including:

a central processing unit formed by one or several calculation cells of a multi-cell computer platform, resources common to the whole of the platform of which at least a system disk is connected to the central processing unit via addressable means for interconnection of the platform to the system disk, and a working memory containing the access path used during the activation of the perimeter in order to launch an operating system contained in the system disk, this access path being composed of an upper part defining the hardware elements to be run through in order to reach the interconnection means from the processing unit, this upper part being solely a function of the processing unit used in this perimeter, and a lower part defining the hardware elements to be run through in order to reach the system disk from the interconnection means, this lower part being solely a function of the position of the system disk with respect to the interconnection means, an administration tool adapted to define an operating activity capable of being launched successively on several different perimeters, the activity bringing together software means to be utilised in order to carry out this activity, these software means including at least one operating system capable of managing the hardware resources of the perimeter on which the activity is to be launched, characterised in that it includes:

a module for saving in a memory of a list of access paths containing the lower parts of the access paths to the system disks, a module for association with the activity the lower part, stored in the list of access paths, corresponding to the system disk including the operating system launched during this activity, a module for automatic updating of the access path contained in the working memory of a perimeter by combining the upper part of the access path of this perimeter with the lower part of the access path associated with the activity with the aid of the module for association.

According to other characteristics of the a system for automatic updating of an access path to the system disk according to the invention:

the module for saving includes a sub-module for neutralisation of the access path to be recorded in the list of access paths, this module for saving being capable of deleting the upper part of the complete access path to a system disk to be recorded in the list of access paths, each perimeter includes a startup program (BIOS) capable of storing the access path to the new system disk in the working memory of the perimeter, and this startup program is adapted to transmit automatically to the module for saving at least the lower part of the complete access path to the new system disk.

The invention also relates to a memory intended to be used in a configurable system according to the invention, characterised in that it includes an identity file associating an identifier of an operating activity and an identifier of the lower part of a corresponding access path to the system disk including the operating system launched during the execution of this activity.

BRIEF DESCRIPTION OF DRAWINGS

The invention will be better understood upon reading the following description, given solely by way of example and with reference to the drawings, in which.

DESCRIPTION OF PREFERRED EMBODIMENT

Figure 2:
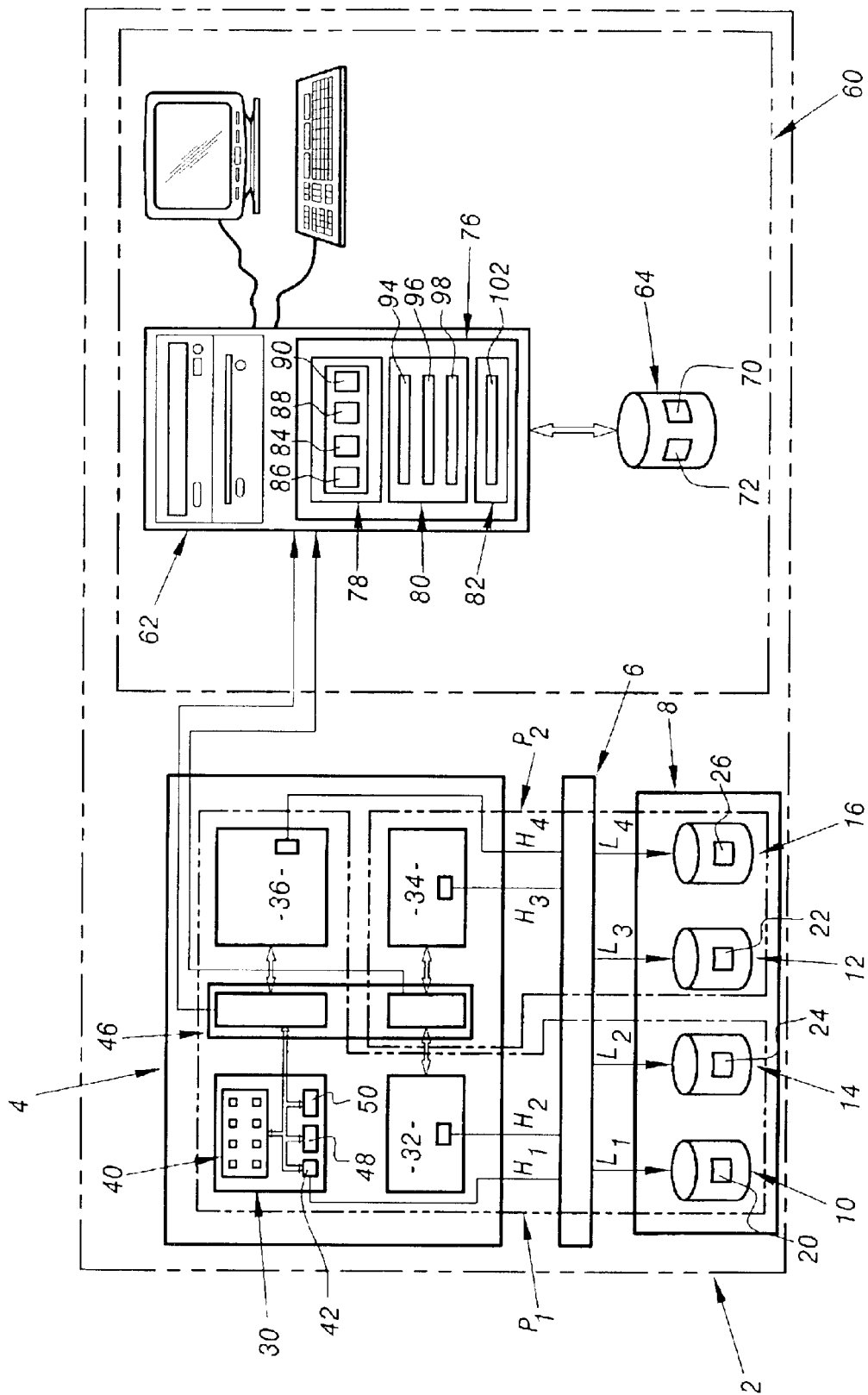
FIG. 2 is a schematic illustration of the hardware architecture of a system according to the invention.

FIG. 2 shows a configurable system 2 of computer resources including a multi-cell platform 4 connected via interconnection means 6 to common computer resources 8.

Here by way of example the common computer resources include solely bulk memories. These bulk memories are composed here of two data disks 10 and 12 and two system disks 14 and 16. The data disks 10 and 12 are intended to contain application software and/or data to be processed. Here the data disk 10 contains application software 20 and the data disk 12 contains application software 22. These items of software 20, 22 are for example software for management of databases, software known under the term ERP (Enterprise Resource Planning), or software for administration of the computer resources.

Here the system disks 14 and 16 include respectively an operating system 24 and an operating system 26. The operating systems 24 and 26 are capable of managing the computer resources and hardware resources of the platform 4. Thus these operating systems offer functionalities for installation of a new system disk. These operating systems are for example conventional operating systems such as UNIX, LINUX or WINDOWS NT.

Each of the disks of the common resources 8 is connected, by its own connection, to the interconnection means 6. The access paths from the interconnection means 6 to the disks 10, 12, 14 and 16 are respectively denoted $L_1$, $L_3$, $L_2$ and $L_4$. These access paths correspond for example to the address of the input/output port of the interconnection means 6 to which the disk is connected. In the following description, each access path from the interconnection means 6 to a system disk will be called the lower parts of an access path to a system disk. Thus in the example described here the system 2 includes two lower parts of access paths: $L_2$ and $L_4$.

The multi-cell platform 4 is divided into a plurality of calculation cells. Here the platform 4 comprises four identical calculation cells 30, 32, 34 and 36. Thus only the cell 30 will be described in detail.

The cell 30 is capable of executing, in an autonomous manner or in co-operation with other cells, the operating activities recorded in the common resources. For that, this cell or this group of cells is managed by one of the operation systems recorded in the common resources.

The cell 30 includes a central processing unit 40 connected via a data and address bus to an input/output board 42 and to local working memories. The data and address bus is likewise connected to an assembly 46 of cards for interface with an administration tool of the platform 4.

The central processing unit 40 is intended to execute calculation operations. For this purpose it includes, in the embodiment described here, eight 64-bit microcontrollers capable of executing these calculation operations in parallel and simultaneously.

The input/output board 42 is intended to ensure the exchanges of information between the common resources and the cell 30. For that, it is connected by an information exchange connection to the interconnection means 6.

Two local working memories 48 and 50 are shown here. The memory 48 is a non-volatile NVRAM memory intended to contain the access path to the system disk which should be launched on the cell 30. Therefore this access path indicates which is the succession of hardware segments to be run through in order to reach the system disk. In an architecture such as that of the system 2, this access path is composed of two parts: an upper part and the lower part previously described facing the common resources 8. The upper part describes the hardware segments to be run through in the cell 30 in order to reach the input/output board connected to the interconnection means 6, that is to say for the cell 30 for example the address of the board 42. Thus, as no operation of rewiring of a cell to the interconnection means 6 is carried out, the upper part is constant for each cell. In fact, the succession of hardware segments in order to reach the input/output board connected to the interconnection means 6 is not modified for a given cell, irrespective of the system disk used by this cell.

The lower part corresponds, for its part, to a given system disk. It is independent of the cell or of the group of cells using this system disk. In fact, in so far as the system disks are not physically displaced or rewired, the access paths of the interconnection means 6 of the system disks remain unchanged.

In the following description, the upper part of the access paths of the cells 30, 32, 34 and 36 will be respectively denoted $H_1$, $H_2$, $H_3$ and $H_4$.

The memory 50 includes the startup program or BIOS (Basic Input Output System) program. This BIOS program carries out the elementary functions of interface between the hardware resources of the cell 30 and an operating system executed on this cell. This BIOS program is capable, moreover, of launching the operating system corresponding to the access path stored in the memory 48. It is also capable, under the command of the launched operating system, of modifying and/or storing a new access path in the memory 48.

In the system 2 described here, the BIOS program is equally adapted so that, when a command for modification or storing of a new access path in the memory 48 is transmitted by the operating system, the new access path is likewise transmitted to the assembly 46 of interface cards.

Finally, each cell includes, stored in one of its local working memories, a serial number enabling it to be distinguished from other cells of the platform 4.

The interconnection means 6 are capable of connecting any one of the cells of the platform 4 to any one of the disks 10, 12, 14 and 16. Thus, by virtue of the interconnection means 6, no rewiring operation is necessary in order to connect any one of the disks to any one of the cells of the platform 4. These interconnection means are, in this case, a network dedicated to the storage of information, for example in accordance with a SAN (Storage Area Network) architecture. It is produced here from products known under the terms of "Switch Fiber Channel" and marketed for example by the company Brocade Communications Systems, Inc., 1745 Technology Drive, San Jose, Calif. 95110, U.S.A. and bearing the reference numbers SW 3800 or SW 2040 from this supplier.

The system 2 also includes an administration tool 60 connected via the assembly 46 of interface cards to the cells of the platform 4. This administration tool 60 is capable of managing the configuration of the platform 4. The interface cards here are interfaces for exchange of information between the administration tool 60 and the different cells of the platform 4.

The administration tool 60 is for example realised by a separate calculator 62 of the platform 4, equipped with a screen and a keyboard and associated with a memory 64.

The memory 64 contains two lists of data 70 and 72. The list 70 contains the lower part of the access path to each system disk associated with the platform 4. Therefore in this case this list 70 contains the lower parts $L_2$ and $L_4$.

The list 72 contains the definition of a plurality of data domains capable of being executed on the platform 4. A data domain brings together, on the one hand, an identity file and, on the other hand, a file for definition of a hardware perimeter of computer resources. The identity file includes an identifier of an operating activity and identifiers of the software resources implemented in order to execute this activity. The identifiers of the software resources here contain at least one identifier of an operating system and, possibly, one or several identifiers of application software to be launched. Moreover, the identity file includes save attributes of the execution context of the activity. In particular, these save attributes are intended to contain all of the configuration parameters necessary for the execution of the operating system of the activity in such a way that this operating system can be executed with the same configuration parameters on any perimeter. The independence of the operating system with regard to the hardware resources perimeter on which it is or will be executed is therefore assured. Amongst these save attributes, one of them is the lower part of the access path to the system disk containing the operating system on which the application software is to be executed corresponding to the identifier of the operating activity to be executed.

The file for definition of a perimeter contains the definition of the hardware computer resources intended to be implemented in order to execute the operating activity corresponding to the activity identifier recorded in the identity file of this domain. The definition of a perimeter includes one or several references to cells of the platform 4, at least one reference to a system disk and one or several references to data disks. By way of example, the list 72 here includes two domains denoted $D_1$ and $D_2$. The domain $D_1$ comprises the definition of a perimeter $P_1$ and an identity file $Id_1$. The perimeter $P_1$ defined in this example comprises the cells 30, 32 and 36 of the platform 4, as well as the data disk 10 and the system disk 14. The identity file $Id_1$ for its part comprises an activity identifier $A_1$, an identifier corresponding to the application software 20, an identifier corresponding to the operating system 24, and a save attribute of the lower part of the access path equal to $L_2$ or equal to an identifier of the lower part $L_2$. The domain $D_2$ comprises a file for definition of a perimeter $P_2$ and an identity file $Id_2$. The perimeter $P_2$ defined in this example comprises the cell 34, the data disk 12 and the system disk 16. The identity file $Id_2$ for its part contains an activity identifier $A_2$, an identifier corresponding to the application software 22, an identifier corresponding to the operating system 26, and a save attribute of the lower part of the access path equal to $L_4$ or equal to an identifier of the lower part $L_4$.

Figure 1:
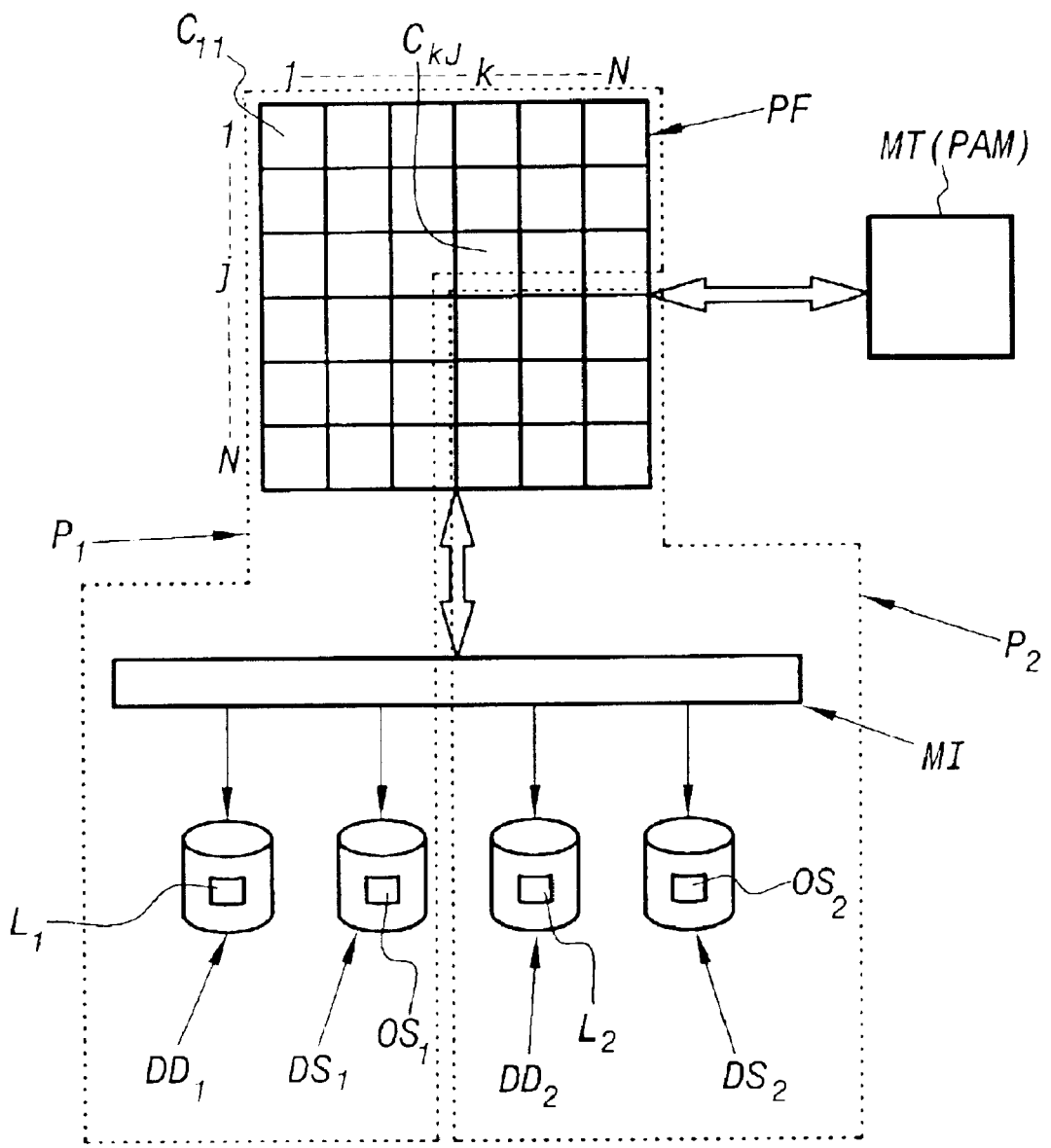
FIG. 1 is a schematic illustration of a known multi-cell platform.

The perimeters $P_1$ and $P_2$ are represented schematically by dotted lines in FIG. 1.

In the case where a perimeter, such as the perimeter $P_1$, including a plurality of cells is activated on the platform 4, only one of the cells is a master cell, whilst the other cells of the same perimeter are slave cells. Thus this assembly of cells behaves in reality as one single multiprocessor processing unit. In such a situation only the access path recorded in the master cell is used to launch the operating system capable of managing the hardware computer resources of this perimeter. The master cell is for example automatically determined by choosing the cell having the smallest serial number in the perimeter. Thus in the situation represented in FIG. 2, that is to say when the perimeters $P_1$ and $P_2$ are configured on the platform 4, the complete access path stored in the working memory of the perimeter $P_1$ is $H_1/L_2$, whilst the one stored in the working memory of the perimeter $P_2$ is $H_3/L_4$.

The calculator 62 is equipped with administration software 76. This software is intended, under the command of an operator, to define and to activate new data domains in the system 2. It is likewise capable of automatically saving, in the list 70 of access paths, the lower parts of access paths to new system disks installed from one perimeter activated on the platform 4. For that, it includes means 78 for definition of a new domain, a module 80 for saving the lower part of the access paths in the list 70, and a module 82 for activation of a domain on the platform 4.

The means 78 are adapted to define new domains under the command of the operator. For this purpose they include in particular a module 84 for association of a file for definition of a perimeter and an identity file of an activity. This association module 84 is for example associated here with a module 86 for creation of a file for definition of a perimeter and with a module 88 for creation of an identity file. The module 86 for creation of a file for definition of a perimeter is capable of defining, under the command of the operator, the hardware computer resources which form part of a new perimeter. The module 88 for creation of an identity file is capable of defining an activity, that is to say all of the software means to be implemented in order to carry out this activity. This module 88 is therefore adapted to record, under the command of the operator, the activity identifier, the identifier of the operating system and the identifier or identifiers of the application software. This module 88 is likewise capable of selecting, in the list 70 of access paths, the lower part corresponding to the system disk containing the operating system of the activity and of recording it in the save attribute provided for this purpose in the identity file. The module 78 likewise includes a module 90 for recording in the list 72 the new domain defined with the aid of the modules 84, 86 and 88.

The save module 80 is capable of automatically recording the lower part of an access path to a new system disk during the installation of the latter from an activated perimeter. For this purpose it includes a sub-module 94 for receiving the new access path to a new system disks transmitted by the BIOS program of the perimeter used in order to carry out the installation of the new system disk. The module 80 likewise includes a sub-module 96 for neutralisation of the access paths received and a sub-module 98 for recording the neutralised access paths in the list 70.

The sub-module 96 is capable of replacing the upper part of an access path received via the sub-module 94 by a generic character. In this case this generic character is, by way of example, the character: "$". For this purpose this neutralisation sub-module 96 is capable of recognising the particular structure of the upper part of the access path and of replacing it by the character "$".

The module 82 is intended to activate, on the platform 4, the data domains recorded in the list 72. This activation module 82 includes in particular a sub-module 102 for updating of the access path, in the working memory 48 of the master cell of the perimeter defined in the data domain to be activated. This updating sub-module is capable of replacing the lower part of the access path currently recorded in the local working memory of the perimeter by that referenced in the identity file of the domain to be activated.

The way in which the system 2 functions will now be described with the aid of FIG. 3 and in the particular case where the perimeters currently active on the platform 4 are the perimeters $P_1$ and $P_2$.

Figure 3:
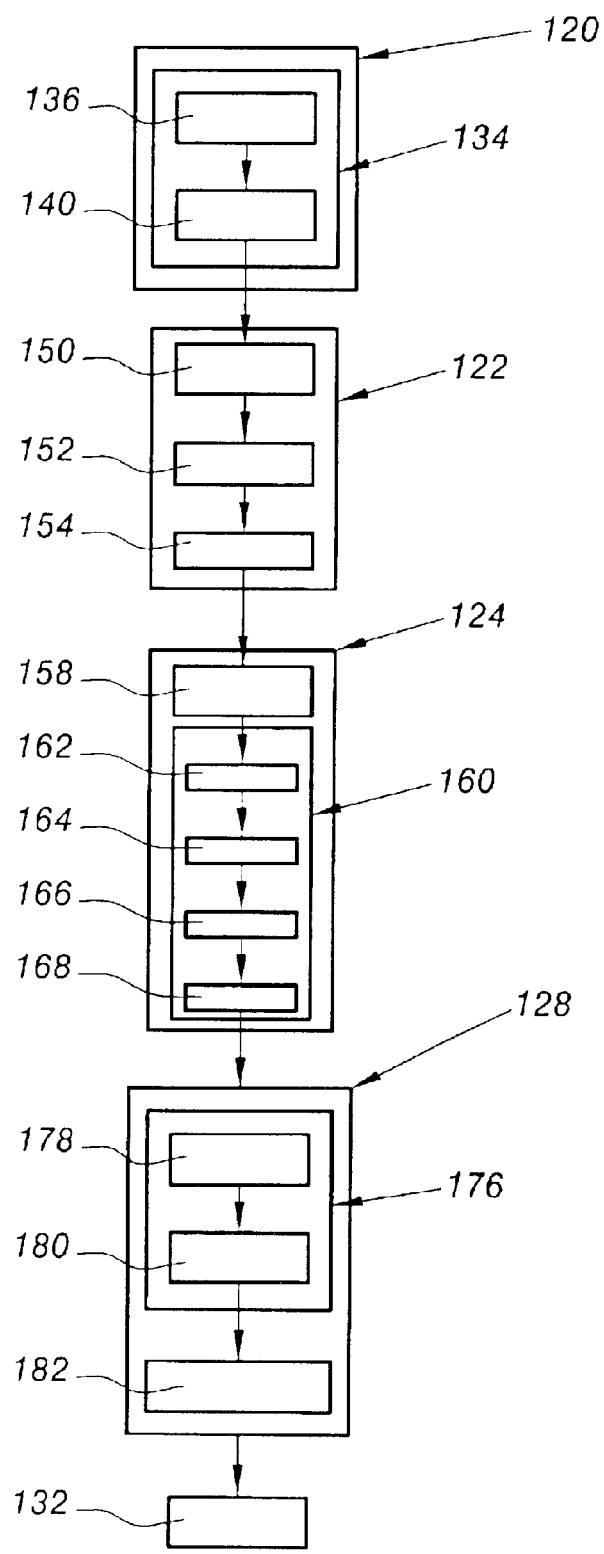
FIG. 3 is a flow chart of a method of configuration of perimeters of computer resources according to the invention.

The method of FIG. 3 comprises five principal successive steps 120, 122, 124, 128 and 132.

The step 120 is a step of definition of a new perimeter $P_3$ on the platform 4 in order to execute the operating activity $A_1$. This step 120 includes principally a step 134 of creation, by the operator of the administration tool 60, of a new data domain $D_3$ in the list 72 of data domains. It includes to successive sub-steps 136 and 140.

During the sub-step 136 the operator creates, with the aid of the module 86, a file for definition of the new perimeter $P_3$. By way of example, the new perimeter $P_3$ defined during this sub-step includes the cell 34, the data disk 10 and the system disk 14.

During the sub-step 140 the new data domain $D_3$ is formed by association, with the aid of the module 84, the file for definition of the perimeter $P_3$ defined during the previous sub-step 136 and the identity file $Id_1$ already defined for the activity $A_1$ in the domain $D_1$ of the list 72. Finally, at the end of the sub-step 140 the new domain $D_3$ is recorded in the list 72 of data domains with the aid of the module 90.

At this stage, before execution of the step 122, the perimeters $P_1$ and $P_2$ are assumed to be inactive or are deactivated by the operator of the system 2, such that the hardware computer resources corresponding to the perimeter $P_3$ are available on the platform 4.

During the step 122 the operator activates, with the aid of the module 82, the domain $D_3$ recorded in the list 72. During this step 122, the module 82 for activation of a perimeter commences by initialising and configuring the computer resources corresponding to the perimeter $P_3$ as they are defined by the file for definition of the perimeter $P_3$ of the domain $D_3$. Next it restores the execution context of the operating activity $A_1$ from the information recorded in the save attributes of the identity file $Id_1$ of the domain $D_3$. In particular, before the execution of the BIOS program of the cell 34, this step includes an operation 150 of updating of the access path of the local working memory of the cell 34. This updating operation 150 consists of replacing the lower part of the access path currently contained in the local working memory of the cell 34 by the lower part recorded in the identity file $Id_1$ of the domain $D_3$. Thus in the example described here this operation consists of replacing the access path $H_3/L_4$ previously used when the perimeter $P_2$ was active by the updated access path $H_3/L_2$.

Next, during an operation 152 the activation module 82 launches the BIOS program of the cell 34. This BIOS program in turn launches the execution of the operating system 24 contained in the system disk 14 corresponding to the access path $H_3/L_2$.

Finally, during an operation 154 the application software 20 is launched either automatically or by the operator on the new perimeter $P_3$ managed by the operating system 24.

Thus by virtue of the updating of the working memories of the new perimeter before the execution of the BIOS program it is possible to transfer one and the same activity onto a new perimeter of computer resources without it being in any way necessary to reinstall the system disk associated with this activity from this new perimeter.

At this stage the system disk 16 is assumed, purely by way of illustration, to have been de-installed, such that the lower part $L_4$ no longer appears in the list 70 and it is necessary to reinstall it.

The step 124 is a step of installation of a new system disk from a currently activated perimeter. This step 124 will be described here in the particular case where the perimeter activated on the platform 4 is the perimeter $P_3$. It is assumed here that the new system disk to be installed is the system disk 16 of FIG. 1. The step 124 includes a first sub-step 158 of updating of the complete access path of the non-volatile working memory of the cell 34. This sub-step 158 is effected by the operating system 24 which controls the BIOS program so that this latter records the new access path to the system disk 16 in the local working memory of the cell 34. This new access path corresponds here to the path $H_3/L_4$. The sub-step 158 is followed by a sub-step 160 of saving the lower part of the new access path in the list 70. The sub-step 160 includes four successive operations 162, 164, 166 and 168. The operation 162 is an operation of transmission of the new access path to the administration tool 60. This operation 162 is executed by the BIOS program which transmits automatically to the administration tool 60 the new access path which it has just recorded in the working memory of the cell 34. The access path transmitted by the BIOS program is the complete access path, that is to say it includes the upper part and the lower part of the access path. During the operation 164 carried out by the sub-module 94 the administration tool 60 receives this access path and transmits it to the neutralisation sub-module 96. Then during the neutralisation operation 166 the sub-module 96 for neutralisation of the save module 80 replaces the upper part of the access path received, that is to say in this case $H_3$, by the generic character "$".

Finally, during the recording operation 168 the access path neutralised during the operation 166 is recorded in the list 70 of access paths by the sub-module 98. In this example the recorded neutralised access path is therefore: $/L_4$. Thus only the information which is pertinent and reusable for the definition of other data domains, that is to say the lower part of the access path, is memorised. In fact, it is not useful to memorise the complete access path because the upper part of the access path depends upon the cell which will be used in order to access the system disk.

During a step 128 the operator defines a new activity $A_3$ carried out with the aid of the operating system of the system disk 16 which has just been installed during the step 124 and with the aid of the application software. This step 128 starts with a sub-step 176. During this sub-step 176 the operator creates, with the aid of the module 88, a new identity file denoted $Id_3$ corresponding to the new activity $A_3$. This sub-step 176 includes essentially an operation 178 of definition of the operating activity $A_3$ to be executed and an operation 180 of association with this activity $A_3$ of the lower part corresponding to the system disk to be used.

The operation 178 consists for example of entering the identifier of activity $A_3$ and the identifiers of the application software and of the operating system to be executed. Here the identifier of the application software entered corresponds to the software 20 and the identifier of the operating system corresponds to the operating system 26. The operation 180 consists of selecting within the list 70, with the aid of the module 88, the lower part of the access path to the system disk 16, that is to say here the lower part $L_4$. During the operation 180 the lower part selected is recorded in the corresponding save attribute of the file $Id_3$ defined during the operation 178.

The new activity $A_3$ is intended to be executed on the perimeter $P_3$. Thus the step 128 also includes a second sub-step 182 which consists of creating a new domain $D_4$ associating the perimeter $P_3$ and the new identity file $Id_3$. This sub-step 182 is similar to the sub-step 140 and therefore will not be described in detail.

Once the computer resources necessary for the perimeter $P_3$ have been released, a step 132 of activation of the domain $D_4$ is executed. This step 132 is similar to the step 122 and therefore will not be described in detail here.

Thus, since this new activity $A_3$ is associated with the lower part of the access path to its disk system and the system 2 is adapted so as to update the local memories of the perimeters before their activation, it is possible subsequently to transfer this new activity $A_3$ to other perimeters without this necessitating a new reinstallation of the system disk on the part of the operator. In the particular embodiment described here, it is sufficient for this purpose to activate on the platform 4 a data domain associating the definition of the new perimeter with the identity file $Id_3$.

Therefore with the aid of the system 2 described above the operator can easily transfer an operating activity from one perimeter to a different perimeter. This is particularly useful for example when an operating activity temporarily requires a higher processing power than that available in the perimeter on which it is currently executed.

Moreover, by virtue of the saving of the execution context of the activity in an identity file and the restoration of this execution context before the launching of this activity on a new perimeter the operating system and the application software which are used in order to form this activity do not need to be specially adapted in order to be executed in a reconfigurable system such as the system 2. The operating system and the application software can therefore be conventional ones.

The system 2 has been described here in the particular case where the data disks and the system disks are physical entities which are independent of one another. However, in a variant the disk system can equally contain one or several items of application software as well as their data. In this situation the system disk corresponds to a portion of a more extensive information storage space.

The system 2 has also been described here in the particular case where the access paths are neutralised before being recorded in the list 70 of access paths. However, as a variant the complete access paths, that is to say composed of the upper part and of the lower part, are recorded in the list 70 of access paths. In this variant the step of neutralisation of the access path is carried out during the operation of updating of the local working memory contained in the new perimeter to be activated.

In another variant the BIOS program transmits only the lower part of the access path to the administration tool. Thus in this variant the step of neutralisation of the complete access path is effected not by the administration tool itself but directly by the BIOS program for example.

The system 2 has been described in the particular case where the installation of a new system disk must be executed from an activated perimeter. As a variant, the administration tool includes a supplementary module for installation of a new system disk. This supplementary module to be executed on the administration tool 60 is capable of recording directly in the list 70 at least the lower part of the access path to this new system disk. In this variant therefore the installation of a new system disk is not carried out from an activated perimeter but from the administration tool 60.

As a variant, the administration tool, which has been described as being separate from the platform 4, is integrated into the hardware of this multi-cell computer platform.

The operation 150 of updating of the access path before the execution of an activity on a new perimeter has been described in the particular case where the upper part of the access path is pre-recorded in the local working memory of this new perimeter. Thus in the embodiment described above only the lower part of the access path pre-recorded in the local working memory of the new perimeter is replaced by that associated with the activity which is going to be executed on this new perimeter. As a variant, or when there is no upper part pre-recorded in the working memory, the upper part of the access path of the new perimeter is pre-recorded in the memory 64 associated with the administration tool, for example in the file for definition of a new perimeter. Thus in this variant the sub-module for updating of the access path is adapted in order to create the complete new access path by combining the upper part contained in the file for definition of the new perimeter and the lower part associated with the activity which is going to be launched on this new perimeter. This variant has the advantage of not depending upon the content of the local working memory recorded during previous configurations of the multi-cell platform. In fact, in this variant the complete access path is updated during each launch of an activity on a new perimeter.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method for automatic updating of an access path to the system disk of the perimeter, the perimeter being configured in a configurable system of computer resources adapted to:
   configure several perimeters intended to be activated simultaneously or successively, each perimeter including:
      a central processing unit formed by one or several calculation cells of a multi-cell computer platform, resources common to the whole of the platform of which at least a system disk is connected to the central processing unit via an addressable interconnection for interconnection of the platform to the system-disk, and
      a working memory containing the access path used during the activation of the perimeter in order to launch an operating system contained in the system disk, the access path being composed of an upper part defining the hardware elements to be run through in order to reach the addressable interconnection from the processing unit, the upper part being solely a function of the processing unit used in the activated perimeter, and a lower part defining the hardware elements to be run through in order to reach the system disk from the addressable interconnection the lower part being solely a function of the position of the system disk with respect to the addressable interconnection,
   define an operating activity capable of being launched successively on several different perimeters, the operating activity bringing together software to be utilised in order to carry out the activity, the software including at least one operating system capable of managing the hardware resources of the perimeter on which the activity is to be launched, wherein the method comprises:
      during the installation of a new system disk, a step of saving the lower part of the access path to the new system disk in a list of access paths stored in a data memory,
      on the occasion of the definition of the operating activity, a step of associating with the operating activity the lower part, stored in the list of access paths, corresponding to the system disk including the operating system launched during the activity,
      on the occasion of the launching of the activity on a perimeter, a step of automatic updating of the access path contained in the working memory of the perimeter by combining the upper part of the access path of the perimeter with the lower part of the access path associated with the activity during its definition.

2. Method as claimed in claim 1, wherein the step of association consists of storing in the memory an identity file containing an identifier of the operating activity and an identifier of the lower part of the access path recorded in the list, the lower part corresponding to the system disk including the operating system launched during the execution of the activity.

3. Method as claimed in claim 1 wherein the step of saving includes an operation of neutralisation of the access path to be recorded in the list of access paths, the neutralization operation consisting of deleting the upper part of the complete access path to the new system disk and entering in the list of access paths, only the access path to the new system disk without its upper part.

4. Method as claimed in claim 2 wherein the step of saving includes an operation of neutralisation of the access path to be recorded in the list of access paths, the neutralization operation consisting of deleting the upper part of the complete access path to the new system disk and entering in the list of access paths, only the access path to the new system disk without its upper part.

5. Method as claimed in claim 1, wherein when the installation of the new system disk is effected from a perimeter including a startup program (BIOS) capable of storing the access path to the new system disk in the working memory of said perimeter, and the step of saving includes:
   transmitting to an administration tool associated with the data memory the lower part of the access path to the new system disk, the transmission operation being carried out by the startup program, and
   recording in the list of access paths the lower part transmitted by the startup program, the recording operation being carried out by the administration tool.

6. Method as claimed in claim 3, wherein when the installation of the new system disk is effected from a perimeter including a startup program (BIOS) capable of storing the access path to the new system disk in the working memory of the perimeter, and the step of saving includes:

transmitting to an administration tool associated with the data memory the lower part of the access path to the new system disk, the transmission operation being carried out by the start up program and recording in the list of access paths of the lower part transmitted by the startup program, the recording operation being carried out by the administration tool.

7. Method as claimed in claim 6 wherein during the transmission of the lower part of the access path, the startup program transmits to the administration tool the complete access path to the new system disk, and that the operation of neutralisation of the access path and recording in the list of access paths are carried out successively by the administration tool.

8. Method as claimed in claim 1, wherein when an activity is launched on a perimeter including a startup program (BIOS) capable of launching the operating system, the method includes, after the step of updating of the new perimeter, a step of launching of the operating system corresponding to the updated access path, carried out by the startup program (BIOS).

9. A system for automatic updating of an access path to the system disk, including:
 a plurality of hardware perimeters of computer resources intended to be activated simultaneously or successively, each perimeter including:
  a central processing unit formed by one or several calculation cells of a multi-cell computer platform
  resources common to the whole of the platform of which at least a system disk is connected to the central processing unit via an addressable interconnection for interconnection of the platform to the system disk, and
  a working memory containing the access path used during the activation of the perimeter in order to launch an operating system contained in the system disk, the access path being composed of an upper part defining the means from the processing unit, the upper part being solely a function of the processing unit used in the perimeter, and a lower part defining the hardware elements to be run through in order to reach the system disk from the address interconnection, the lower part being solely a function of the position of the system disk with respect to the address interconnection,
 an administration tool adapted to define an operating activity capable of being launched successively on several different perimeters, the activity bringing together software to be utilised in order to carry out this activity, the software including at least one operating system capable of managing the resources of the hardware perimeter on which the activity is to be launched,
 wherein the system further comprises:
  a first module for saving in a data memory a list of access paths containing the lower parts of the access paths to the system disks,
  a second module for association with the activity the lower part, stored in the list of access paths, corresponding to the system disk including the operating system launched during the activity,
  a third module for automatic updating the access path contained in the working memory of a perimeter by combining the upper part of the access path of the perimeter with the lower part of the access path associated with the activity with the aid of the second module.

10. System as claimed in claim 9, wherein the first module includes a sub-module for neutralisation of the access path to be recorded in the list of access paths, the first module being capable of deleting the upper part of the complete access path to a system disk to be recorded in the list of access paths.

11. System as claimed in claim 9, wherein each perimeter includes a startup program (BIOS) capable of storing the access path to the new system disk in the working memory of the perimeter, the startup program being adapted to transmit automatically to the first module at least the lower part of the complete access path to the new system disk.

12. System as claimed in claim 10, wherein each perimeter includes a startup program (BIOS) capable of storing the access path to the new system disk in the working memory of the perimeter, the startup program being adapted to transmit automatically to the first module at least the lower part of the complete access path to the new system disk.

13. A memory intended to be used in a configurable system as claimed in claim 9 and having an identity file associating an identifier of an operating activity and an identifier of the lower part of a corresponding access path to the system disk including the operating system launched during the execution of the activity.

14. A memory intended to be used in a configurable system as claimed in claim 10 and having an identity file associating an identifier of an operating activity and an identifier of the lower part of a corresponding access path to the system disk including the operating system launched during the execution of the activity.

15. A memory intended to be used in a configurable system as claimed in claim 11 and having an identity file associating an identifier of an operating activity and an identifier of the lower part of a corresponding access path to the system disk including the operating system launched during the execution of the activity.

16. A memory intended to be used in a configurable system as claimed in claim 12 and having an identity file associating an identifier of an operating activity and an identifier of the lower part of a corresponding access path to the system disk including the operating system launched during the execution of the activity.

* * * * *